United States Patent [19]

Verschueren

[11] 3,730,974

[45] May 1, 1973

[54] SIGNALLING NETWORK FOR AUTOMATIC TELECOMMUNICATION SWITCHING SYSTEM

[75] Inventor: Guy A. J. M. G. H. Verschueren, Aartselaar, Belgium

[73] Assignee: International Standard Electric Corporation, New York, N.Y.

[22] Filed: Mar. 5, 1971

[21] Appl. No.: 121,260

[30] Foreign Application Priority Data

Mar. 20, 1970 Belgium..............................7003952

[52] U.S. Cl.......................................................178/3
[51] Int. Cl...............................................H04l 11/00
[58] Field of Search..............................178/3, 2 R, 4; 179/18 E, 18 EA

[56] References Cited

UNITED STATES PATENTS

| | | | |
|---|---|---|---|
| 3,403,383 | 9/1968 | Kienzle et al. | 178/2 R |
| 3,469,021 | 9/1969 | Dahlblom et al. | 178/3 |
| 3,347,990 | 10/1967 | Doyle et al | 178/2 R |
| 3,493,691 | 2/1970 | Shimizu et al | 179/18 E |
| 3,415,944 | 10/1968 | Viesi | 178/3 |

*Primary Examiner*—Thomas W. Brown
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

Disclosed is an automatic toll telegraph switching system in which an exchange includes a central control unit to control the establishment of a connection through the system. In the forwarding of a connection to a remote exchange, sender devices and auxiliary receiver devices in the exchange are used only during the establishment of a connection to a remote exchange and for sufficient duration to enable the remote exchange to receive and approve a class of traffic signal from the calling line and verification signals. The sender and auxiliary receiver devices are then released. This way the number of such devices which must be provided is significantly reduced.

6 Claims, 1 Drawing Figure

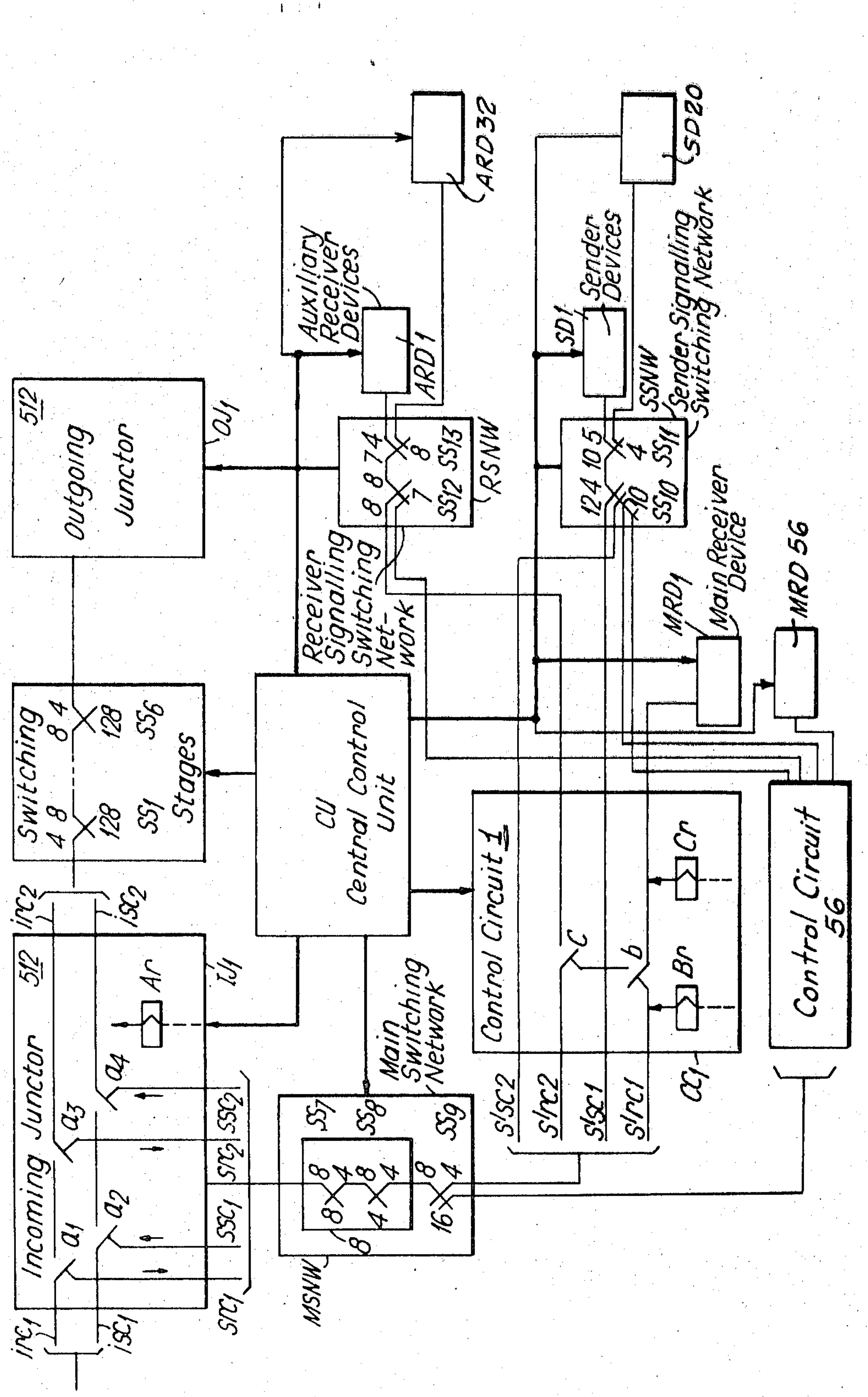
Outgoing Junctor
512
OJ1
Auxiliary Receiver Devices
ARD1
ARD32
Sender Devices
SD1
SD20
Sender Signalling Switching Network
SSNW
RSNW
Receiver Signalling Switching Network
MRD1
Main Receiver Device
MRD 56
Switching Stages
SS1
SS6
CU
Central Control Unit
Control Circuit 1
Control Circuit 56
Incoming Junctor
IJ1
Ar
Br
Cr
Main Switching Network
MSNW
SS7
SS8
SS9
SS10
SS11
SS12
SS13
CC1

SIGNALLING NETWORK FOR AUTOMATIC TELECOMMUNICATION SWITCHING SYSTEM

The present invention relates to an automatic telecommunication switching system including a communication switching network with a plurality of input and output circuits intercoupled by one or more switching stages, a first and a second plurality of receiver devices and a number of sender devices coupled to said communication switching network by signalling switching networks, and a control unit able to control the selection and establishment of communication paths through said communication switching network and of signalling paths through said signalling switching networks.

Such an automatic telecommunication switching system is already known from the article "10-C toll telephone switching system" by H.H. Adelaar and J.D. Beierle published in Electrical Communication, Volume 44, N°2, 1969, pages 92–95.

In the drawing of this article the blocks designated by senders and receivers in fact each include a plurality of pairs of sender devices and receiver devices, each pair of sender and receiver devices being coupled to a distinct output of a signalling switching network. Since the total number of receiver devices is equal to the total number of sender devices this known system becomes expensive when the time during which signals have to be transmitted is much smaller than the time during which signals must be received, as may be the case in automatic telegraph switching systems.

It is therefore an object of the present invention to provide an automatic telecommunication switching system of the above type including a number of sender devices which is smaller than the number of receiver devices, while maintaining the whole signalling switching network relatively simple.

In the above known automatic telecommunication switching system the receiver devices of said second plurality are adapted to receive signals via the output circuits. Although the choice of the second plurality of receiver devices is independent from the choice of the first plurality of receiver devices, it is dependent on the number of sender devices required to transmit signals via the output circuits and vice-versa since each receiver device of the second plurality is paired with such a sender device.

It is therefore a further object of the present invention to provide an automatic telecommunication switching system of the above type which includes a second plurality of receiver devices, the quantity of which is minimum and independent of the number of sender devices.

The present automatic telecommunication switching system is particularly characterized in that said communication switching network is coupled to said first plurality of receiver devices via a main signalling switching network and at least to a second plurality of said sender devices or to said second plurality of receiver devices via the series connection of said main signalling switching network and a sender or receiver signalling switching network respectively.

According to another characteristic of the present automatic telecommunication switching system said communication switching network is coupled to said first plurality of receiver devices via signal receive channels extending through said main signalling switching network and at least to said second plurality of sender or receiver devices via signal send or receive channels extending through the series connection of said main signalling switching network and said sender signalling switching network or of said main signalling switching network and said receiver signalling switching network respectively.

In accordance with a preferred embodiment of the invention the present automatic telecommunication and more particularly toll telegraph switching system includes a communication switching network with a plurality of incoming and outgoing junctors intercoupled by a plurality of switching stages, a number of main receiver devices coupled to the inputs of said incoming junctors via a main signalling switching network, a number of sender devices coupled to the normally not interconnected inputs and outputs of said incoming junctors via the series connection of a sender signalling switching network and said main signalling switching network, and a number of auxiliary receiver devices coupled to the outputs of said incoming junctors via the series connection of a receiver signalling switching network and said main signalling switching network, in such a manner that signals can be simultaneously sent and received via said incoming junctor inputs and outputs.

The above mentioned and other objects and features of the invention will become more apparent and the invention itself will be best understood by referring to the following description of an embodiment taken in conjunction with the accompanying drawing which schematically represents an automatic telecommunication switching system according to the invention.

This automatic telecommunication switching system which is a toll telegraph system includes a communication switching network with 512 incoming junctors such as IJ1 and 512 outgoing junctors such as 0J1 intercoupled by six series connected switching stages SS1 to SS6 of which only SS1 and SS6 are shown. Switching stage SS1 is constituted by 128 switches each with four inputs and eight outputs, and switching stage SS6 is constituted by 128 switches each with 8 inputs and 4 outputs. Each incoming junctor such as IJ1 has an input which is constituted by a first information receive channel irc1 and a first information send channel isc1 and an output which is constituted by a second information receive channel irc2 and a second information send channel isc2. Normally the first and second information receive channels irc1 and irc2 are disconnected from each other by the make contacts of the change-over contacts *a*1 and *a*3 of a relay A*r* included in the incoming junctor. Likewise the first and second information send channels isc1 and isc2 are disconnected from each other by the make contacts of the change-over contacts *a*2 and *a*4 of the same relay A*r*.

The first and second information receive and send channels of each incoming junctor are normally connected to a corresponding first and second signal receive and send channel inlet, each set of such four signal receive and send channel inlets constituting a distinct one of the inputs of a signalling path of a main signalling switching network MSNW. For instance, the first and second information receive and send channels irc1, isc1, irc2 and isc2 of incoming junctor IJ1 are normally connected to the first and second signal receive and send channel inlets src1, ssc1, src2 and ssc2 of a signalling path of the MSNW via the break contacts of the change-over contacts *a*1, *a*2, *a*3 and *a*4 respectively.

The main signalling switching network MSNW is a concentrating network since it has 512 inputs and 64 outputs and is constituted by three switching stages SS7, SS8 and SS9. The switching stages SS7 and SS8 are constituted by 8 identical switching blocks each with 64 inlets and 16 outlets which are each connected to an inlet of a distinct one of the 16 switches having eight inlets and four outlets constituting the switching stage SS9. Each such switching block is constituted by eight switches with eight inlets and four outlets and by four switches also with eight inlets and four outlets, the four outlets of each of the eight 8/4 switches being each connected to an inlet of a distinct one of the four 8/4 switches.

The 64 outputs of the main signalling switching network MSNW are each constituted by first and second signal receive and send channel outlets. For instance, the output shown of this network is constituted by the first and second signal receive and send channel outlets s'rc1, s'sc1, s'rc2 and s'sc2. The MSNW is able to connect the signal channel inlets of each of its 512 inputs to corresponding signal channel outlets of each of its 64 outputs.

Among the latter 64 outputs only 56 are used and each of these 56 outputs, i.e. the constituent channel outlets thereof, is coupled via an associated control circuit among 56 control circuits to a distinct one among 56 main receiver devices, to a number of 20 sender devices via a sender signalling switching network SSNW and to plurality of 32 auxiliary receiver devices via a receiver signalling switching network RSNW.

For instance the first signal receive channel outlet s'rc1 shown is connected to the main receiver device MRD1 via the control circuit CC1, associated to this outlet and to this main receiver device, and more particularly via the break contact of change-over contact *b* of relay B*r* included in this control circuit CC1. The first and second signal send channel outlets s'sc1 and s'sc2 shown are each directly connected to a distinct one of the 120 inputs of the SSNW which is a concentrating network since it has 120 inputs and 20 outputs, only 112 inputs being used. It is constituted by two switching stages SS10 and SS11 which are constituted by 10 switches each with 12 inlets and four outlets and by four switches each with 10 inlets and five outlets, respectively, the four outlets of each of the ten 12/4 switches being each connected to an inlet of a distinct one of the four 10/5 switches. The 20 outputs of the SSNW are each connected to a distinct one of 20 sender devices SD1–20. Finally, the second signal receive channel outlet s'rc2 shown is coupled to a distinct one of the 56 inputs of the RSNW via the control circuit CC1 and more particularly via the make contact of change-over contact *c* of relay C*r* included in this control circuit CC1. The receiver signalling switching network RSNW also is a concentrating network since it has 56 inputs and 32 outputs. It is constituted by two switching stages SS12 and SS13 which are constituted by seven switches each with eight inlets and eight outlets and eight switches each with seven inlets and four outlets respectively, the eight outlets of each of the seven 8/8 switches being each connected to an inlet of a distinct one of the eight 7/4 switches. The 32 outputs of the RSNW are each connected to a distinct one of 32 auxiliary receiver devices ARD1–32

The toll telegraph switching system further includes a central control unit CU which is constituted by a program controlled processor and which is able to control the above incoming and outgoing junctors, switching stages and signalling switching networks, main and auxiliary receiver devices, sender devices and control circuits. These controls are schematically indicated by thick lines issuing from the control unit CU and terminating in arrows at the controlled circuits. These controls are performed by the control unit by executing various programmes which are only briefly indicated hereinafter since the structure of the control unit CU and the details of the programmes have nothing to do with the claimed invention:

- detection of calling incoming junctors among the 512 incoming junctors;
- search for at least one free main receiver device among the 56 main receiver devices and for a free path in the main signalling switching network MSNW between each calling incoming junctor and such a free main receiver device;
- search for free sender devices among the 20 sender devices and for a free path in the sender signalling switching network SSNW between the MSNW and a free sender device;
- search for free auxiliary receiver devices among the 32 auxiliary receiver devices and for a free path in the receiver signalling switching network RSNW between the MSNW and a free auxiliary receiver;
- search for free outgoing junctors, giving access to predetermined directions, among the 512 outgoing junctors and for a free path in the switching network SS1–SS6 between calling incoming junctors and free outgoing junctors;
- control of the establishment of the above free paths;
- control of the receiver devices and sender devices including storing signals received by these receiver devices and sending stored signals toward these sender devices;
- control of the control circuits associated to selected main receiver devices. The processor CU may be of the type described in the previously cited article by H. Adelaar, or as described in the article by H. H. Adelaar entitled "Semi-electronic Reed Crosspoint Telephone Switching System 10–CX" on pages 33–46 of Volume 42, Number 1 – 1967 Electrical Communications. In U.S. Pat. No. 3,557,315, issued Jan. 19, 1971, based on filing in the Netherlands Jan. 23, 1967, a processor is shown of the type usable herein.

Each of the above main and auxiliary receiver devices includes a series-to-parallel converter (not shown) in order to convert the serially received signals constituting each telegraph character into a parallel code before entering this character into the control unit. Each of the above sender devices includes a parallel-to-series converter (not shown) in order to convert the constituent signals of each telegraph character which are received in parallel from the control unit into a serial code before transmitting them.

The operation of the above automatic toll telegraph switching system will be described hereinafter.

It is supposed that the incoming junctor IJ1 shown has been brought in the calling condition due to an originating exchange (not shown) having applied a forward seizure signal to the input of the IJ1 and more particularly to the information receive channel irc1. This forward seizure signal is obtained by applying a different polarity than the normal one to this receive channel irc1.

The calling condition of the incoming junctor IJ1 is detected by the control unit CU which subsequently searches for at least one free main receiver device and associated control circuit which may be reached from the IJ1 via a free signalling path in the main signalling switching network MSNW, as well as for a free sender device among the 20 sender devices SD1–20 which may be connected via a free signalling channel in the SSNW to this free signalling path. It is supposed that a free signalling path shown is found in the MSNW between the calling IJ1 and the free main receiver device MRD1 and associated control circuit CC1 shown. This signalling path in the MSNW is constituted by four signal channels having inlets src1, ssc1, src2, ssc2 and outlets s'rc1, s'sc1, s'rc2, s'sc2, the MRD1 being coupled to the signal receive channel outlet s'rc1. It is also supposed that a free signal channel is found in the SSNW between the signal/send channel outlet s'sc1 and the sender device SD1.

The control unit CU then controls the establishment of the above free paths in the MSNW and in the SSNW due to which the information receive and send channels irc1, isc1, irc2 and isc2 of the IJ1 are connected to the corresponding signal receive and send channels having inlets src1, ssc1, src2, ssc2 and outlets s'rc1, s'sc1, s'rc2, s'sc2 respectively. The latter outlets are connected to the free main receiver device MRD1 via contact *b* in the control circuit CC1, to the sender device SD1 via the SSNW, to another input of the SSNW and to contact *c* in the CC1 respectively.

A predetermined time interval after the application of the forward seizure signal to the IJ1 the originating exchange which is supposed to operate in the so-called *c*-type signalling mode transmits two telegraph characters to the IJ1; i.e., a telegraph character indicating the class of traffic of the calling line and a transmission verificating telegraph character. These two telegraph characters are received in the main receiver device MRD1 via the information receive channel irc1, the IJ1, the signal receive channel src1-s'rc1 in the MSNW and contact *b* in the CC1. In this main receiver device MRD1 the serially arriving signals of these two characters are converted into a parallel code in the series-to-parallel converter included in this main receiver device MRD1. The thus converted signals are then entered in the control unit CU where they are further processed.

It should be noted that the above C-type signalling as well as the so called A and B types of signalling are described in the CCITT Blue Book on the IIIrd Plenary. Assembly on telegraph technique, published by the International Telecommunication Union, Volume VII, December 1964, and more particularly in the Recommendations U11 and U1 thereof respectively. The control unit CU subsequently transfers a transmission confirmation signal and the identity of the exchange to the sender device SD1 wherein this signal and this identity are converted into a serial code in the parallel-to-series converter included therein. The thus transformed signals are then transmitted by the sender device SD1 to the originating exchange via the SSNW, the signal send channel s'sc1–ssc1 in the MSNW, the IJ1 and the information send channel isc1. After the sender device SD1 has performed this operation, it is disconnected from the MSNW by the control unit CU.

The originating exchange meanwhile continues transmitting telegraph characters to the main receiver device MRD1, these characters being now selection information. These characters are each converted in the MDR1 and then entered in the control unit CU. When this control unit CU has received the first characters constituting the prefix indicating the direction wanted, it starts searching for a free outgoing junctor in this direction and for a free communication path in the switching network SS1–SS6 between the IJ1 and this free outgoing junctor. It is supposed that a free communication path is found between the IJ1 and the free outgoing junctor OJ1.

As soon as the control unit CU has finished this operation, it starts controlling the establishment of the free path between the IJ1 and the OJ1 and when this path is established it controls the application of a seizure signal to the send channel isc1 of the OJ1 and from there to the distant exchange coupled to this OJ1. The control unit CU also operates the relay *Cr* in the control circuit CC1 so as to interconnect the signal receive channel outlet s'rc2 and the receiver signalling switching network RSNW.

Simultaneously it searches for a free sender device and for a free signalling path in the SSNW between this sender device and the signal send channel outlet ss'c2. The control unit CU also searches for a free auxiliary receiver device among the 32 auxiliary receiver devices ARD1–32 and for a free signalling path in the RSNW between this free sender device and the signal receive channel outlet s'rc2. It is supposed that in the SSNW a free path is found between the channel outlet s'sc2 and the free sender device SD20 as well as in the RSNW between the channel outlet s'rc2 and the free auxiliary receiver device ARD1.

The control unit CU then controls the establishment of the last mentioned free paths. A predetermined time interval after the application of the above seizure signal to the information send channel isc2 the control unit CU operates the sender device SD20 to send two telegraph characters to the distant exchange in a serial way i.e., a telegraph character indicating the class of traffic of the calling line and a transmission verifying telegraph character. When these two characters have been correctly received in the distant exchange, the latter sends a backward signal to the OJ1 which is received in the auxiliary receiver device ARD1 via the switching network SS1–SS6, the information receive channel irc2, the IJ1, the signal receive channel src2–s'rc2 in the MSNW, contact *c* and the established signal channel in the RSNW. The control unit CU in the meantime controls the sending to the distant exchange of the stored selection information.

When the sender device SD20 and the auxiliary receiver device have finished their operation relay *Ar* in the IJ1 is operated to disconnect the sender device SD20 and the main and auxiliary receiver devices MRD1 and ARD1 from the IJ1 and to through-connect the IJ1 and the OJ1.

From the above it follows that the time interval during which the sender devices SD1 and SD20 and the auxiliary receiver device ARD are connected to the calling incoming junctor IJ1 is much smaller than the time interval during which the main receiver device MRD1 remains connected to the IJ1. This is the reason why the number of sender devices and auxiliary receiver devices is much smaller than the number of main receiver devices.

The following may also be noted: when compared with a system wherein signals must be able to be received either via the incoming junctors or the outgoing junctors (A or B signalling) an additional number of receiver devices, i.e., the auxiliary receiver devices, is required when such signals must be able to be simultaneously received via these incoming and outgoing junctors (C signalling). For the same reason also an additional number of sender devices is required in case signals must be simultaneously transmitted via the incoming and outgoing junctors. But due to the fact that the time interval during which two receiver devices or two sender devices must be simultaneously connected to a same junctor is small when compared with the time interval during which a main receiver device or a main sender device must remain connected to this junctor, the number of additional or auxiliary receiver devices and of additional or auxiliary sender devices is small when compared with the number of main receiver devices and of main sender devices respectively.

From the above it follows that in case only A and B-type signalling are used, the total number of sender devices can be decreased and no auxiliary receiver devices are required, a main receiver device being able to be connected either to a first or to a second information receive channel via contact *b*.

While the principles of the invention have been described above in connection with specific apparatus, it is to be clearly understood that this description is made only by way of example and not as a limitation on the scope of the invention.

I claim:

1. An automatic telecommunications system comprising a program controlled intermediate switching center including a plurality of incoming circuits and a plurality of selectible outgoing circuits, a plurality of switching stages interconnecting said incoming and outgoing circuits for completing information paths therebetween wherein each information path comprises a send channel and a receive channel, a plurality of signalling paths from said incoming circuits and each comprising a set of paired signalling channels for processing signalling data through said center, a plurality of main receiver devices coupled to respective receiving ones of said signalling channels, said main receiver devices individually operative over respective signalling channels during the entire interval of interconnecting of an incoming circuit to a selected outgoing circuit and transmission of signalling data thereover, a main signalling switching network operative to connect an individual one of said main receiver devices over a normally completed path to a receiver signalling channel, a plurality of sender devices operative only during a first and a second sending sub-interval of said interconnecting interval, a second switching network for connecting and disconnecting a sender device to a sending one of said signalling channels, and a plurality of auxiliary receiver devices operable during said second sub-interval, a third switching network coupling one of said auxiliary receiver devices to a second receiver signalling channel and through a normally open path to said main switching network only during said second sub-interval.

2. An automatic telecommunication switching system according to claim 1, wherein each of said signalling paths capable of being established through said main signalling switching network includes a signalling receive channel coupled to a main receiver device of said plurality and at least a second one of said signalling channels coupled to the respective sender and receiver devices via a second one of said sending and receiving signalling switching networks respectively, a control unit for controlling the selection and establishment of paths through said network, these channels having common selection and operation means in said main signalling switching network so that when said control unit selects and controls the establishment of said signalling path through said main signalling switching network it simultaneously selects and controls the establishment of the constituent channels of this path.

3. An automatic telecommunication switching system according to claim 1, wherein a control circuit is individually associated to each main receiver device of said plurality and includes means to couple the inlet of one of said two signal receive channels in said main signalling switching network to either a main receiver device of said plurality or to the input of said third signalling switching network respectively.

4. An automatic telecommunication switching system according to claim 3, wherein said control circuit includes means to connect each main receiver device of said plurality to the outlet of either one of said two signal receive channels included in said main signalling switching network.

5. An automatic telecommunication switching system according to claim 1, wherein each of said main receiver devices includes a series-to-parallel converter, while each of said sender devices includes a parallel-to-series converter.

6. An automatic telecommunication switching system according to claim 1, wherein said input and output circuits are incoming and outgoing junctors respectively.

* * * * *